US 012379779B2

(12) United States Patent
Benedetto (10) Patent No.: US 12,379,779 B2
(45) Date of Patent: Aug. 5, 2025

(54) USING GAZE TRACKING TO EFFECT PLAYER CHOICES IN MULTI PLAYER INTERACTIVE NARRATIVES

(71) Applicant: Sony Interactive Entertainment Inc., Tokyo (JP)

(72) Inventor: Warren Benedetto, Aliso Viejo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/650,621

(22) Filed: Apr. 30, 2024

(65) Prior Publication Data

US 2024/0281062 A1   Aug. 22, 2024

Related U.S. Application Data

(63) Continuation of application No. 18/107,318, filed on Feb. 8, 2023, now Pat. No. 11,972,044, which is a
(Continued)

(51) Int. Cl.
*G06F 3/01* (2006.01)
*A63F 13/213* (2014.01)

(52) U.S. Cl.
CPC ............ *G06F 3/013* (2013.01); *A63F 13/213* (2014.09)

(58) Field of Classification Search
CPC ...... G06F 3/013; G06F 3/011; G06F 3/04842; G06F 3/04815; G06F 3/017;
(Continued)

(56) References Cited

U.S. PATENT DOCUMENTS 6,798,426 B1 * 9/2004 Tateishi ................ A63F 13/822
715/706
10,297,082 B2   5/2019 Wilson et al.
(Continued)

FOREIGN PATENT DOCUMENTS

KR   20090085821 A  *  8/2009  ........... A63F 13/212
WO   WO 2023/136920      7/2023

OTHER PUBLICATIONS

PCT/US2022/053677, PCT, Warren Benedetto, Using Gaze Tracking to Effect Player Choices in Multi Player Interactive Narratives, Dec. 21, 2022.
(Continued)

*Primary Examiner* — Koosha Sharifi-Tafreshi
(74) *Attorney, Agent, or Firm* — Fish & Richardson P.C.

(57) ABSTRACT

The present disclosure is directed to controlling outcomes in a game that includes multiple different users playing respective roles of specific virtual characters. The multiple different users may be present at a same physical location, or the different users may be located at different physical locations when movement of their eyes is tracked. Here, a user may choose one of a set of provided selections by simply looking at the chosen selection for a period of time or by looking at the chosen selection and performing an action or gesture. This functionality allows multiple different users to control actions performed by different specific characters via an online multiplayer system. Depending on what a first user looks at, that first user or a second user may be provided with a corresponding set of selections or audio/visual content via respective gaming devices operated by the first and the second user.

17 Claims, 5 Drawing Sheets

Related U.S. Application Data continuation of application No. 17/576,456, filed on Jan. 14, 2022, now Pat. No. 11,586,284.

(58) Field of Classification Search
CPC ... G06T 19/006; G06T 19/003; A63F 13/213; A63F 13/25; A63F 13/847; A63F 13/212; A63F 2300/8082; A63F 13/45
See application file for complete search history.

(56) References Cited

U.S. PATENT DOCUMENTS

| | | | |
|---|---|---|---|
| 10,744,403 B2* | 8/2020 | Huang | A63F 13/69 |
| 10,970,031 B2 | 4/2021 | McCoy et al. | |
| 11,586,284 B1 | 2/2023 | Bennedetto | |
| 11,972,044 B2 | 4/2024 | Bennedetto | |
| 2007/0110298 A1* | 5/2007 | Graepel | G06V 40/28 |
| | | | 345/619 |
| 2011/0007174 A1* | 1/2011 | Bacivarov | G06T 7/40 |
| | | | 348/222.1 |
| 2015/0055808 A1* | 2/2015 | Vennstrom | G06F 3/012 |
| | | | 381/307 |
| 2016/0132290 A1* | 5/2016 | Raux | G06F 3/167 |
| | | | 704/275 |
| 2018/0005429 A1* | 1/2018 | Osman | A63F 13/56 |
| 2020/0298100 A1* | 9/2020 | Ambinder | A61N 1/36025 |
| 2022/0398002 A1* | 12/2022 | Zhu | A63F 13/60 |
| 2023/0229232 A1 | 7/2023 | Bennedetto | |

OTHER PUBLICATIONS

PCT Application No. PCT/US2022/053677, International Search Report and Written Opinion dated Feb. 13, 2023.
U.S. Appl. No. 18/107,318, Office Action dated Oct. 13, 2023.
PCT Application No. PCT/US2022/053677, International Preliminary Report on Patentability dated Jul. 25, 2024.

* cited by examiner

USING GAZE TRACKING TO EFFECT PLAYER CHOICES IN MULTI PLAYER INTERACTIVE NARRATIVES

CROSS-REFERENCE TO RELATED APPLICATION

The present application is a continuation and claims the priority benefit of U.S. patent application Ser. No. 18/107,318 filed Feb. 28, 2023, now U.S. Pat. No. 11,972,044, which is a continuation and claims the priority benefit of U.S. patent application Ser. No. 17/576,456 filed Jan. 14, 2022, now U.S. Pat. No. 11,586,284, which are incorporated herein by reference in their entirety.

BACKGROUND OF THE INVENTION

1. Field of Invention

The present invention generally relates to digital interactive content. More specifically, the present invention relates to uses of gaze-tracking in multiplayer digital games.

2. Description of the Related Art

There are various interactive content titles that include different possible narratives that are shaped based on the actions of a user. For example, interactive games may allow a user to control a character (or avatar) and provide an input that specifies how the character interacts with objects (including other characters) in a virtual environment. For example, a character may be located in a specific location within the virtual environment and encounter an assailant character. The user may opt between having the character fight the assailant or fleeing the scene by inputting instructions via a controller (e.g., press X button to begin fighting, press O to run away, or other combinations of button presses). The interactive content title may respond to such inputs by updating a display of the virtual environment to include a fight scene or a scene in which the character runs away.

The virtual environment may be implemented in virtual reality (VR) and generated by a head mounted display (HMD) or one or more projectors. Navigation and character controls within virtual environments may be implemented using a variety of controllers, including handheld controllers, voice- or gesture-based controllers, wearable sensors and sensor-based controls, and other input devices and systems. The variety of different controllers may be a barrier for newer, more inexperienced players who have not acquired or developed the muscle memory, reflexes, or basic knowledge about how to use each controller effectively.

There is therefore a need in the art for improved systems and methods that allow users to control characters and interactions within the virtual environment in accordance with eye movement.

SUMMARY OF THE CLAIMED INVENTION

Embodiments of the presently claimed invention may relate to a method, a non-transitory computer readable storage medium, and systems that identify content to provide to different specific users playing a game based on items that those different specific user's look at when the game is played. In a first embodiment, a method may include identifying that a first player is focusing on an object displayed on a display of a device of the first player. This the identification may have been made by evaluating received image data of the eyes of the first player after the first player has been associated with a first game character that interacts with a second character of the game. Next a first indication may be sent to a second player device based on the identification that the eyes of the first player are focusing on the object displayed on the display of the first player device. The sending of this first indication may command the second player device to display a first set of selections, and then data may be received from the second player device that corresponds to a first selection of the first set of selections. This method may also include providing a first set of audio/visual (AV) content to the first player via the first player device based on the received data being associated with the first set of AV content. This first set of AV content may include audio of the second game character speaking to the first game character. After the first set of AV content has been provided via the first player device, the method may continue by identifying that the first player has made a second selection of a second set of selections based on the first player focusing on the second selection, and the method may also include sending a second indication to the second player device to command the second player device to provide a second set of AV content to the second player. This second set of AV content may correspond to the second selection.

Method consistent with the present disclosure may be implemented as a non-transitory computer-readable storage medium where a processor executes instructions out of a memory. Here again, the method may include identifying that a first player is focusing on an object displayed on a display of a device of the first player. This the identification may have been made by evaluating received image data of the eyes of the first player after the first player has been associated with a first game character that interacts with a second character of the game. Next a first indication may be sent to a second player device based on the identification that the eyes of the first player are focusing on the object displayed on the display of the first player device. The sending of this first indication may command the second player device to display a first set of selections, and then data may be received from the second player device that corresponds to a first selection of the first set of selections. This method may also include providing a first set of audio/visual (AV) content to the first player via the first player device based on the received data being associated with the first set of AV content. This first set of AV content may include audio of the second game character speaking to the first game character. After the first set of AV content has been provided via the first player device, the method may continue by identifying that the first player has made a second selection of a second set of selections based on the first player focusing on the second selection, and the method may also include sending a second indication to the second player device to command the second player device to provide a second set of AV content to the second player. This second set of AV content may correspond to the second selection.

Systems consistent with the present disclosure may include a first gaming device and a second gaming device, where each of these respective gaming devices include a respective memory and a respective processor that executes instructions stored at the respective memory. The processor of the first player device may execute instructions that identify that a first player that is associated with a first game character has focused on an object displayed on a display of the first player device. The processor of the first player device may then prepare to send a first indication to the second player device based on the identification that the first player is focusing on the object displayed on the display of the first player device. This first indication may be associated with a first set of selections. The processor of the second player device may execute instructions that display the first set of selections on the display of the second player device based on receipt of the first indication. The processor of the second player device may then prepare to send data to the first player device that identifies that a second player has made the first selection of the first set of selections by focusing on the first selection. This system may then provide a first set of audio/visual (AV) content that corresponds to the first selection to the first player via a speaker and a display of the first player device based on receipt of the data sent from the second player device. Here again, this first set of AV content including audio of the second game character may be provided via the speaker of the first player device. The processor of the first player device may then prepare to send a second indication to the second player device after identifying that the first player made a second selection of a second set of selections by focusing on the second selection. Next, the system may provide a second set of AV content to the second player based on the receipt of second indication sent from the first player device when the processor of the second player device executes further instructions.

DETAILED DESCRIPTION

The present disclosure is directed to controlling outcomes in a game that includes multiple different users (i.e. players) playing respective roles of specific game characters. The multiple different users may be present at a same physical location or the different users may be located at different physical locations (or both) when movement of their eyes is tracked. Here, a user may choose one of a set of provided selections by simply looking at the chosen selection for a period of time or by looking at the chosen selection and performing an action or gesture (e.g. a hand gesture, eye blink, or head movement). This functionality allows multiple different users to control actions performed by different specific characters via an online multiplayer system. Depending on what a first user looks at, that first user or a second user may be provided with a corresponding set of selections or audio/visual content via respective gaming devices operated by the first and the second user.

When the several players (users) are located at a same physical location, each of those several players may interact via one or more gaming devices, one or more sets of electronics, a display, individual head mounted displays (HMDs), or some combination thereof. When different players that are located at different physical locations, each of those players may interact with a respective set of electronics, HMDs, or gaming systems.

Each of the respective players of a game may be given an opportunity to select a game character that they wish to "play." Once a particular player selects a character, that player will assume the role of that character when the game is played. For example, a first player may select to play the role of a customer, a second player may select to play the role of a shop owner, and a third play may select to play the role of a wife of the customer. Such a game may also include "non-player characters," where a gaming device plays the role of one or more characters automatically.

When these players play the game, an action performed by one player may be used to identify selections that may be provided to another player. This action may simply be related to the fact that a first player has focused on an object displayed on a display. In an example, imagine a scene in a gun store where there are two characters playing a game. These characters may include a customer and a shopkeeper. In one instance, the customer may be a "player character" (i.e. a character that act according to choices made by a player that has assumed the role of the character) and the shopkeeper may be a "non-player character." Here, the customer may be given the option to "buy an item" or "negotiate a better price." Depending on the player's choice, the shopkeeper would react in a pre-programmed way (e.g. sell the item or give a discount).

Alternatively the shopkeeper may be controlled by another player who is provided their own sets of shopkeeper-specific choices. These choices could be dictated by the choice made by the customer. For example, if the customer chooses to "negotiate a better price," then the player controlling the shopkeeper may be presented with their own options: "offer a lower price" or "laugh and refuse."

Figure 1:
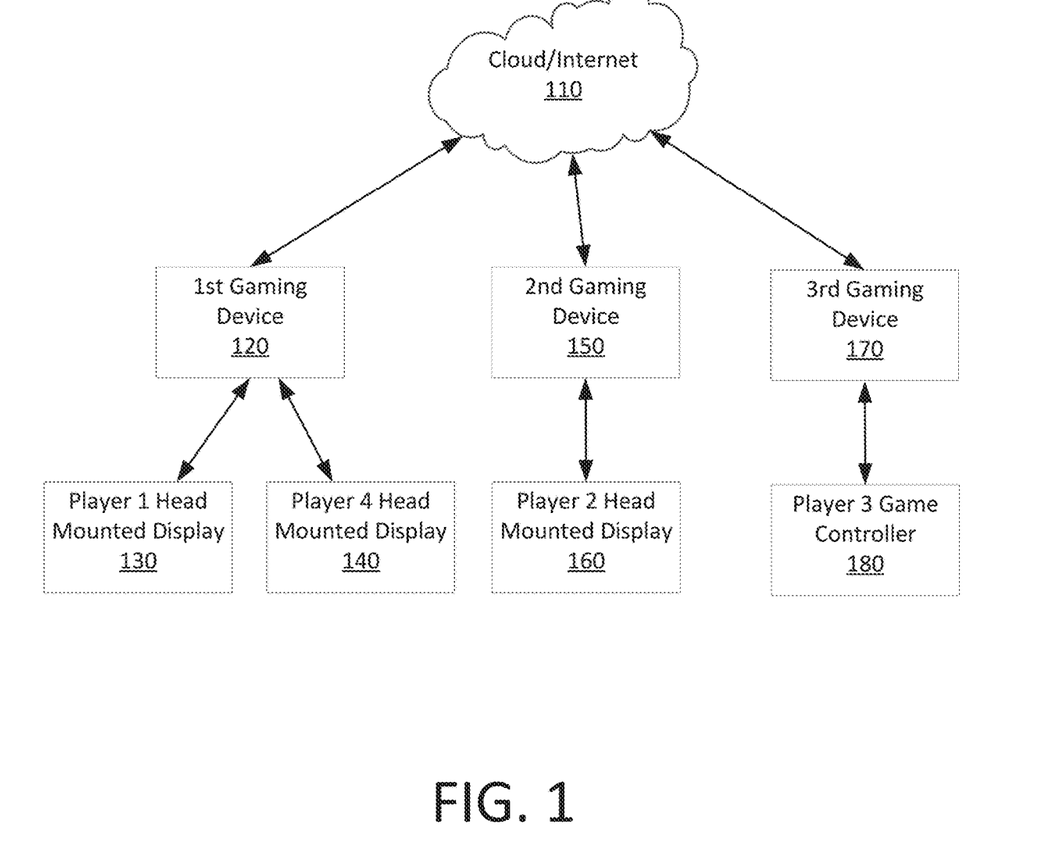
FIG. 1 illustrates an exemplary network environment in which a system for gaze-based controls in multiplayer games may be implemented.

FIG. 1 illustrates an exemplary network environment in which a system for gaze-based controls in multiplayer games may be implemented. As illustrated, the network environment may include different gaming devices 120/150/170 in communication over a communication network (e.g., cloud/Internet 110). Each of the gaming devices 120/150/170 may be associated with one or more players in the same or different physical, geographic locations. FIG. 1 further illustrates that the gaming devices 120/150/170 may further be communication with one or more head mounted displays 130/140/160 or a game controller 180. Gaming device 120, 150, and 170 may be a gaming system (e.g., Sony™ PlayStation), a computer, a handheld device, or another computing device.

As illustrated, player 1 head mounted display (HMD) 130 and player 4 HMD 140 may communicate with the first gaming device 120. Here, player 1 and player 4 may be located in close proximity to the first gaming device 120 with which their respective HMDs 130/140 may be communicating. Each of the different gaming devices (120, 150, & 170) of FIG. 1 may be located at a different physical location and each of these different gaming devices may communicate with each other over the cloud or Internet.

FIG. 1 also illustrates a player 2 HMD 160 communicating with the second gaming device 150 and illustrates a player 3 game controller communicating with the third gaming device 170. The different gaming devices of FIG. 1 may be configured to associate a particular game character with a particular user or player of the game. When head mounted displays are used, a player may experience the game in a virtual reality environment and depending on the capabilities of a particular HMD a user may provide commands to a gaming device via that particular HMD. When a gaming controller is used, a player (e.g. player 3 of FIG. 1) may view the game on a standard display (e.g. a flat panel monitor) and that player may provide commands to the game using their game controller.

Capabilities of particular head mounted displays may allow a user to provide control inputs to control actions performed by a game character that is associated with a particular player HMD. An HMD may receive inputs based on eye tracking data, on user gestures (e.g. hand motions or eye blinking), or combination of both eye tracking and user gestures. In some implementations, the eye tracking and gesture data may also be obtained from cameras and other sensors in a surrounding real-world environment of the respective user. Commands for performing specific types of actions in a virtual environment may be identified based on analysis of where a user is gazing. For example, a particular action may be directed in towards gaze direction that is held for a threshold period of time.

Apparatus of the present disclosure may also include multiple speakers that provide direction-based noises. Here, sounds may be provided to a user via a speaker located at the left, the right, in front of, behind, above, or below a person. Such a three-dimensional (3D) speaker system may be incorporated into a HMD or may be setup in a room of a game player. When such a 3D speaker system is used, noises provided to a user may be directional. For example, the ringing of a bell to the player's left, a rattle snake rattling at the player's feet, an airplane flying above the player, or the sound of a gun cocking behind the player. While such 3D speaker systems may be supported by a particular game, HMD, speaker system, and/or gaming system, the game may still function even when certain players do not have a 3D speaker system available. A game controller, such as the player 3 game controller 180 may be any type of controller known in the art (e.g. a joystick, a two-handed controller, or one or more one handed controllers). Even when a game controller is used, a gaming device or the controller itself may include cameras dedicated to track eye motion of users.

Methods of the present disclosure may provide user's with various types of realism based on limitations of the types of devices that are used to receive user input and to provide content (e.g. sounds, images, or video) to users. While FIG. 1 illustrates head mounted displays, game controllers and gaming devices as separate physical devices, the functionality of each of these devices may be incorporated into a single device. For example, a head mounted display (HMD) may also perform the functions of a gaming device. In such an instance, two HMDs located at a same physical location may act as separate gaming devices or one of these HMDs may act as a master HMD that receives inputs from the second HMD.

In certain instances, graphics or audio may be generated at a cloud server or cloud computing device, which may send generated graphical images or audio content to specific user devices. This could allow computing devices with limited graphics generating capabilities to receive and display high quality graphical images. Moreover, many of the functions described herein may be performed in the cloud by one or more cloud servers or cloud computing device in accordance with cloud-based services associated with a current session. For example, associated data and content may be stored in one or more cloud storage devices, and cloud computing resources may be used to process such data in conjunction with data received from one or more user devices (e.g., devices 120/150/170) in a current session.

Figure 2:
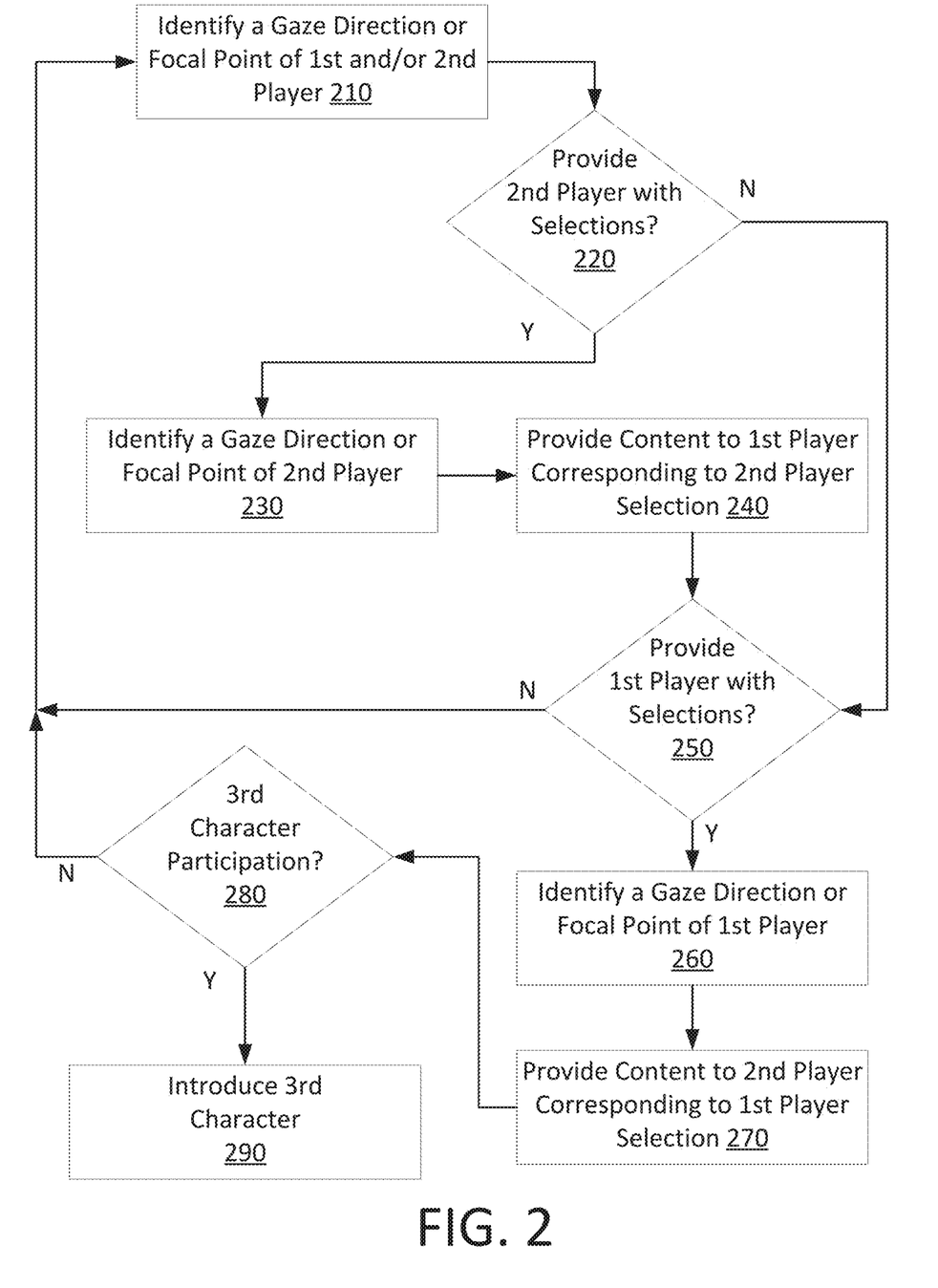
FIG. 2 is a flowchart illustrating an exemplary method for gaze-based controls in multiplayer games.

FIG. 2 is a flowchart illustrating an exemplary method for gaze-based controls in multiplayer games. Such a method may be performed by a gaming device used for multiplayer gameplay. Here, the first and second player may be located at different locations and game actions or sequences may be controlled using communications that are sent to respective gaming devices via the Internet (e.g. the cloud or Internet 110) of FIG. 1.

As mentioned previously, the scenes described above may take place in a virtual reality (VR) setting where players wear head mounted displays (HMDs). In an instance when the player controlling the shopkeeper has chosen to make the shopkeeper a woman outfitted in a low-cut blouse and when the player controlling the customer is looking at the shopkeeper from a first-person perspective, the shopkeeper player may be provided a first set of optional selections when the customer focuses on the shopkeepers face and may be provided a second set of optional selections when the customer focuses on the shopkeepers low-cut blouse. In the first instance, when the gaze of the customer player remains on the shopkeeper's face (e.g. maintaining "eye contact") while choosing to negotiate a better price, then the shopkeeper's response selection choices may be to "offer a lower price" or "laugh and refuse."

In the second instance, when the customer player's gaze drifts to the shopkeeper's low-cut blouse (staring at her cleavage) while choosing to negotiate a better price, the difference in gaze may result in the shopkeeper's being offered choices to say "My eyes are up here" or to smile and flirt by saying "I see that you like what you see." In other words, the shopkeeper's choices may be dictated by the gaze or focal/focus point of the customer player.

The method of FIG. 2 begins with step 210, where a gaze direction or eye focal/focus point of a player (e.g. the first or the second player) may be identified. As discussed above, this could include identifying whether the customer player (first player) is looking at the shopkeeper's face or at the shopkeeper's cleavage and the shopkeeper player (second player) could be provided with the corresponding set of player selections discussed above. After determination step 210 identifies where the first player (the customer player) is looking, determination step 220 may identify whether the second player (the shopkeeper player) should be provided with a set of selections. Determination step 220 may identify that the second (shopkeeper) player should not be provided with a set of selections because the first (customer) player is not looking at the face or the cleavage of the shopkeeper. In such an instance, program flow may move to determination step 250, discussed below.

When determination step 220 identifies that the second (shopkeeper) player should be provided with selections, an appropriate set of selections could be provided to the second (shopkeeper) player. This could include displaying text in a display viewed by the second player and the second player could select a response from a set of responses. Here, selections could be made by the second (shopkeeper) player by staring at a particular line of text for a threshold amount of time (e.g. 5 seconds) or could include the second (shopkeeper) player staring at the particular line of text and making a gesture (e.g. a hand motion, eye motion, or eye blinking). This may include identifying a gaze directions or focal/focus point of the second player in step 230 of FIG. 2 after which content may be provided to the first (customer) player that corresponds to the selection made by the second (shopkeeper) player. Step 240 may include playing a video of the shopkeeper character laughing and saying "no, my price is firm, no discount."

After step 240, program flow may move to determination step 250 that identifies whether the first (customer) player should be offered a set of response selections. For example, these selections could include "alright I'll pay your price" or "I can only spend $200 and am willing to trade this knife to cover the difference."

As discussed above, determination step 250 may be performed after determination step 220 identifies that the second (shopkeeper) player should not be provided selections. In such an instance, the first player may be provided with selections of saying "please show me that forty caliber semi-auto pistol" or may include "what pieces do you have that I can buy for $200."

The first (customer) player may be provided with a set of selections and a selection may be identified based on the gaze direction or focal/focus point of the first player in step 260 of FIG. 2. After step 260, content may be provided to the second (shopkeeper) in step 270 of FIG. 7. This content may include audio of the first (customer) player stating "what pieces do you have that I can buy for $200.

Alternatively, when determination step 250 identifies that the first player selections should not be provided to the first player, program flow may move back to step 210 where a gaze direction or focal point of the first and/or the second player may be identified.

After step 270, program flow may move to determination step 280 that identifies whether a third character should participate in a next scene of interactions between the first and second players, when yes program flow may move to step 290 where a third character is introduced. Here, this third player or character could be controlled by a third player or actions performed by the third character could be automated by a gaming device selecting actions that the third character should perform. Such an automated character may be referred to as a non-player character because the actions of that character are not controlled by a player.

When determination step 280 identifies that a third character should not participate in the next scene of the game, program flow may move back to step 210 where a gaze direction or focal point of the first and/or the second user may be identified. This may result in yet another sequence of interactions between the first player controlling actions of the customer character and the second player controlling actions of the shopkeeper player. Depending on where each respective player is looking, different selections may be provided to respective players and additional content may be provided based on selections made by those respective players. Such interactions could continue until the customer makes a purchase or leaves the gun store, for example.

Figure 3:
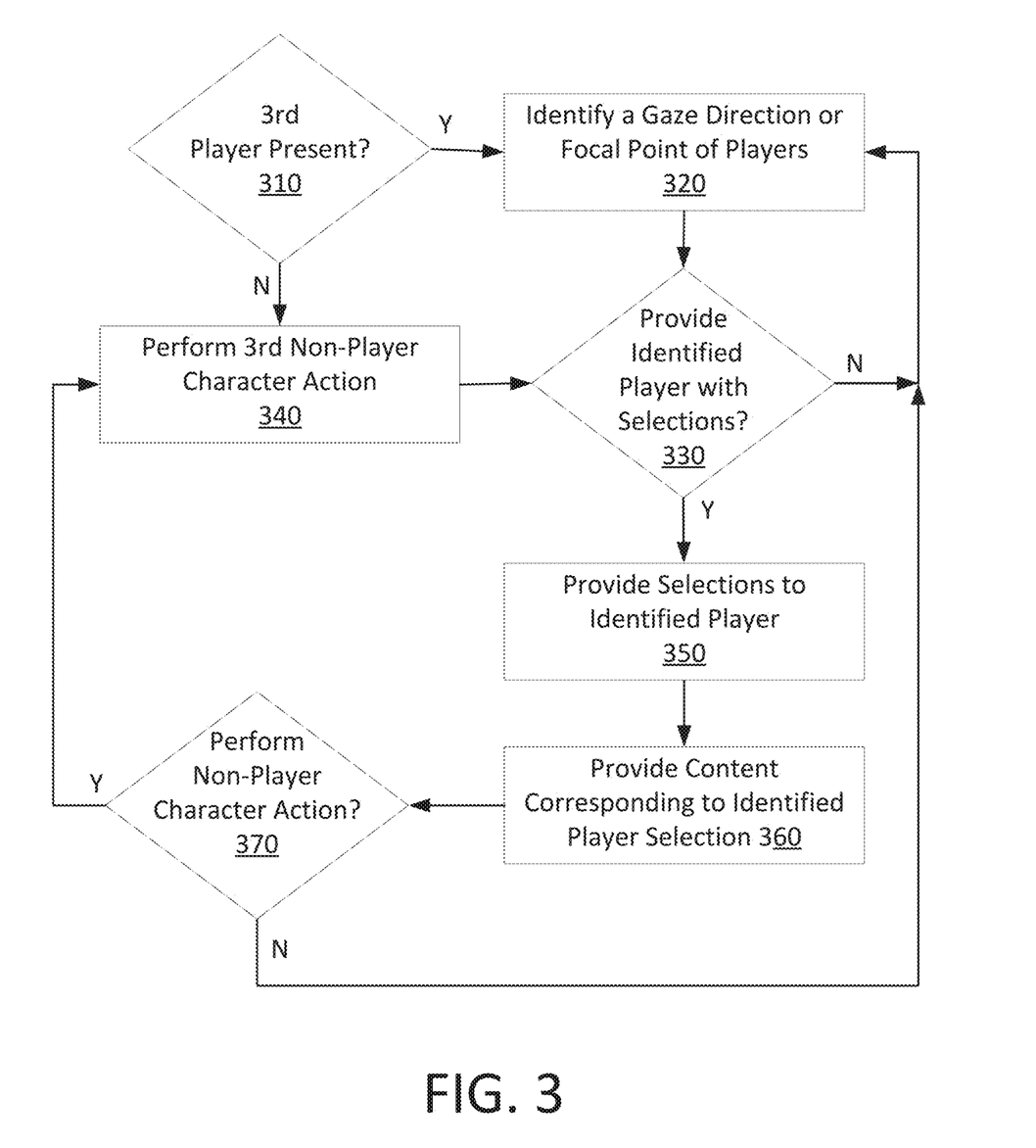
FIG. 3 is a flowchart illustrating another exemplary method for gaze-based controls in multiplayer games.

FIG. 3 is a flowchart illustrating another exemplary method for gaze-based controls in multiplayer games. Such a method may be performed by the game device when a third character or player participates in the game session. The steps of FIG. 3 may be performed after determination step 280 of FIG. 2 identifies that a third character should participate in the game. FIG. 3 begins with determination step 310 that identifies whether a third player is present to control actions of the third character. When determination step 310 identifies that a third player is not present, program flow may move to step 340 where an action is performed by a gaming device that automatically selects an action that the third character should perform.

When determination step 310 identifies that a third player is present, program flow may move to step 320 where a gaze direction or focal/focus point of any or all of the players may be identified. Next, a player may be identified to which a set of selection options could be provided. Determination step 330 may then identify whether an identified player should be provided with a particular set of selection options. Hera again, different sets of selection options provided to specific players could be a function of locations where specific players are looking. Determination step 330 may be performed either after step 320 or after step 340 depending on whether a third player is available to play the game. When determination step 330 identifies that a selection should not be provided, program flow may move back to step 320 where the gaze direction of the players is evaluated again. This may result in program flow looping between steps 320 and 330 repetitively until determination step 330 identifies a player that should be provided with a set of selection options.

When determination step 330 identifies a player that should be provided with selection options, the set of selection options that corresponds to a gaze direction of one player may be provided to any player of the game. In certain instances, instead of a gaze direction of the first player resulting in the selection options being sent to the second player, the selection options may be sent to the first player. For example, the first player may look at a box of ammunition and the first (customer) player may be provided with a set of different statements (such as comments or questions) that the first (customer) player could ask the second (shopkeeper) player. Such a comment could be "I like that plus P hollow point ammo" or question could be "what is the price of that box of ammo?"

Next in step 350, an identified set of selection options could be provided to the identified player and then in step 360 content could be provided that corresponds to a selection made by the identified player. This could result in the first (customer) player asking the second (shopkeeper) player "what is the price of that box of ammo?"

After step 360 program flow may move to determination step 370 where a non-player character action may be performed, when yes, program flow may move to step 340 where a non-player character action is performed by the third character. This could include the third charter making a statement selected automatically by a gaming device. When determination step 370 identifies that a non-player character action should not be performed, program flow may move back to step 320 where a gaze direction or focal/focus point of one or more player is identified again.

The steps of FIG. 3 illustrate that actions performed by multiple characters may be performed based on gaze direction or focal/focus points of specific users playing a game. This may be true even when some characters actions are automated. The steps of FIG. 3 may also be performed based on the steps of FIG. 2 being performed.

In yet another example relating to the shopkeeper scene, when the customer is facing the shopkeeper behind the counter, a bell rings to the left of the customer (discernable via 3D audio) as the door to the shop opens and a third character enters. In an instance when the ringing of the bell is related to the customer's wife (e.g. third player/character of FIG. 3) entering the shop, different selection options may be provided to specific players based on the gaze direction of the customer player.

In an instance when the customer turns and his gaze falls upon his wife, then selection options that may be provided the customer player may include "What are you doing here?" and "You're late." The shopkeeper, in the meantime, may become passive, allowing for words to be exchanged between the customer and his wife.

In an instance when the customer doesn't turn towards the ringing bell, then his wife may enter out of his field of view. The scene between the customer and the shopkeeper may then continue as before, with the customer trying to negotiate a better price and the shopkeeper's making selections as discussed above. In the meantime, a player playing the wife may observe the scene from a different perspective including her husband (the customer) and the shopkeeper and a direction of the game may be based on a gaze direction of the wife.

In an instance when the customer doesn't realize his wife has entered the store, that information can be used to change the shopkeeper's reaction to the customer looking at the second (the shopkeeper) player's cleavage. Now, the second (shopkeeper) player's choices may include a recitation to the customer character of "Isn't that your wife?" or may include a statement to the wife "Your husband should keep his eyes to himself."

In an instance when the third (wife) player isn't looking at the second player (customer, her husband) at the time when the second (customer) player is inspecting the shopkeeper's cleavage, the third (wife) player may be provided with other selection options. Here, the third (wife) player may be provided with selection options of sayings that include "How dare you accuse my husband of such a thing?" Alternatively, when the third (wife) player's gaze indicates that she saw that her husband (first player) did in fact stare at the shopkeeper's (second player's) cleavage, then the third (wife) player may make a selection to say to her husband (first player), "I knew you were a creep, Larry."

In another example, a first player may be playing the role of a detective character investigating a crime scene in the presence of a suspect character controlled by a suspect player. Here, both actions performed by the detective player and the suspect player may be controlled by actions performed by different players. In an instance when the gaze of the detective player falls upon a piece of key evidence—say, a murder weapon—the suspect player might be presented with choices like "attack the detective" or "flee the scene." In an instance when the detective's gaze never touches the evidence, the suspect player may receive no choices. In each of these scenarios, actions performed by certain players may result in selection options being provided to any other player, where each action and a resulting selection cause the game to move in a different direction in ways that may result in different outcomes.

In certain instances a gaze of a player may triggers an action to be performed by a non-player character (NPC): A customer player's gaze on a price tag may be used to trigger an NPC shopkeeper to automatically say "May I help you find something?" In an instance when the player does not look at the price, the NPC shopkeeper may not say the "May I help you find something?" question. Instead, other statements made by the NPC shopkeeper may be provided when the customer looks at another item.

The duration of a gaze may be used to change an intensity of reaction. A quick glance at the shopkeeper's cleavage may provoke one set of choices (or none at all), whereas a prolonged gaze might provoke a different set of more aggressive choices. Gaze threshold times may correspond to a number of seconds, for example two seconds, five seconds, or seven seconds.

Figure 4:
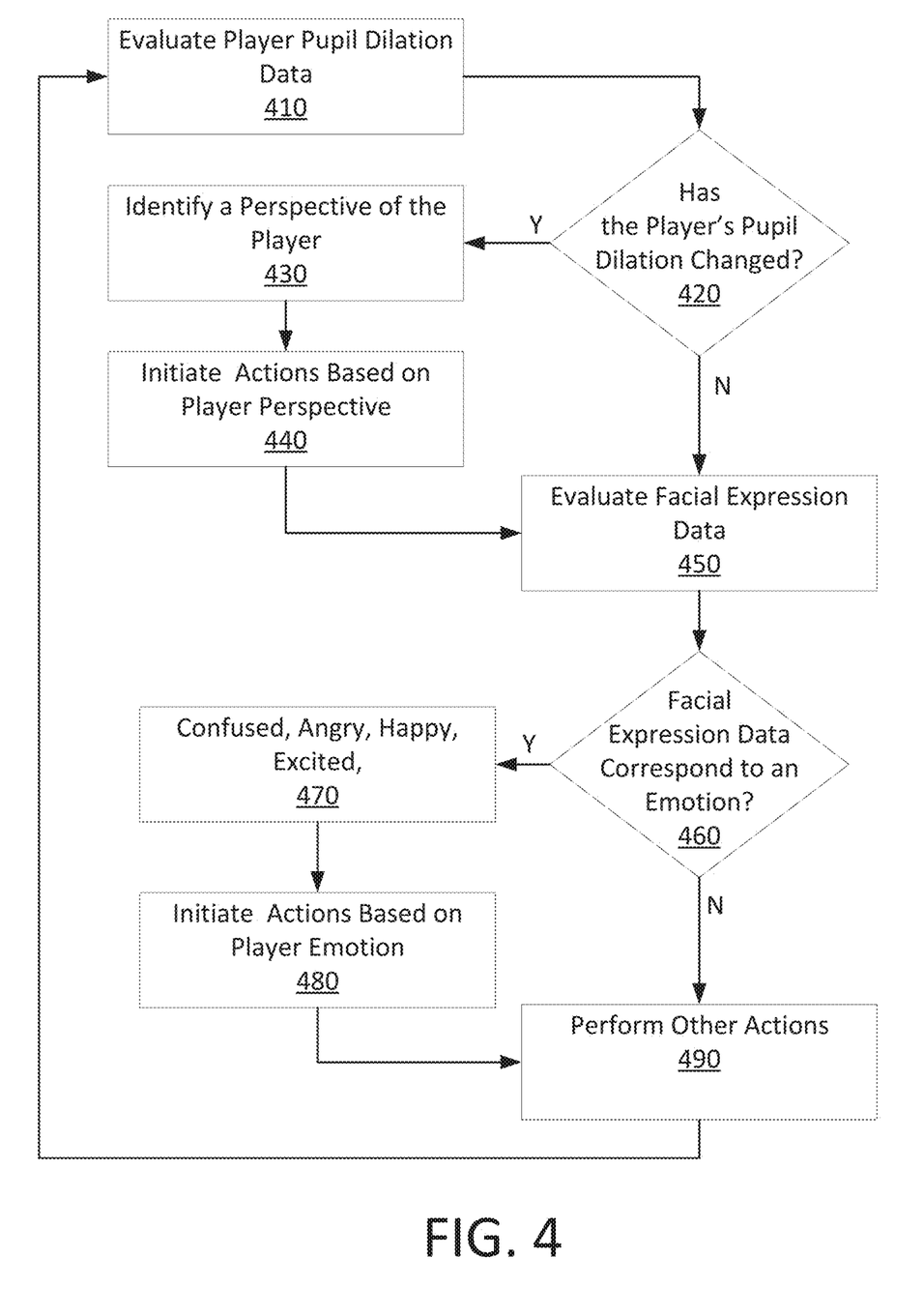
FIG. 4 is a flowchart illustrating yet another exemplary method for gaze-based controls in multiplayer games.

FIG. 4 is a flowchart illustrating yet another exemplary method for gaze-based controls in multiplayer games. Such a method may be performed by a game device to identify a perspective or an emotion of a player. FIG. 4 begins with step 410 where player pupil dilation data may be evaluated. This may include collecting first set of eye image data of the player at a first point in time, evaluating that eye image data to identify how dilated the eyes of the player are at the first point in time, collecting a second set of image data at a second point in time, and identifying how dilated the eyes of the player are at the second point in time. Determination step 420 may then identify whether the player's eye dilation has changed. When the player's eye dilation has not changed, program flow may move to step 450 where facial expression data of the player is evaluated.

When determination step 420 identifies that the players eye dilation has changed, program flow may move to step 430 where a perspective of the player may be identified. Changes in player eye dilation may be used to identify perspectives of "interest" or "suspicion," for example. When the player's pupil widens (gets larger), a gaming system may identify that the player is "interested" in an object or character that the player is currently looking at. In an instance when the player's pupil narrows (gets smaller), the gaming system may identify that the player is "suspicious" of something that they are looking at. Because of this, methods of the present disclosure may make judgements based on observed changes in pupil dilation of a player. When a player appears to be interested in an object, that player may be provided with content (audio and/or visual content) associated with the interest in step 440. For example, when the player's pupil increases in size when viewing a car, that player may be provided with a set of selection options or with an audio question asking if the player would like to drive the car.

In an instance, when the pupil of the player narrows, another character may provide an audio message stating "don't worry, you can trust me" in step 440 of FIG. 4 based on the gaming system identifying that the player appears to be suspicious because of narrowing of the player's pupils.

After step 440, program flow may move to step 450 where facial expression data of a player may be evaluated. Here, interpreted player's facial expressions and/or emotions may be used to change reactions of specific characters. Here, either a full-face camera or special HMD camera may be used to collect images such that the player's expression and/or emotion may be detected. The evaluation performed in step 450 may include collecting multiple images of a player's face overtime and may include identifying that a facial expression of the player has changed. Alternatively, a facial expression from a single image may be evaluated to see if that single facial expression corresponds to an emotion. Determination step 460 may then identify whether a current facial expression or a change in facial expression likely corresponds to an emotion. When determination step 460 identifies that the facial expression data does not correspond to an emotion, program flow may move to step 490 where other actions may be performed.

When determination step 460 identifies that the facial expression data corresponds to an emotion, program flow may move to step 470, where a specific emotion (e.g. confused, angry, happy, excited, or nervous) may be identified. For example, a confused emotion may be identified by a slight squinting of the eyes of the player. The emotion of anger may be identified based on a more pronounced squinting of the eyes, wrinkles forming between the eyebrows of the player, by a grimace of the player's mouth, or some combination of these factors. The emotion of happy may be identified based on identifying that the player is smiling and the emotion of excited may be identified based on identifying that an opening of the player's eye lids have increased in size. The emotion of nervousness may be identified by a smile and a cackling laugh or by noticing that a player is moving their body in a jerky way.

Next in step, 480 of FIG. 4 an action may be initiated based on the identified emotion. These expressions or detected emotions may be used as information may be used that to change a narrative of the game. For example, in an instance when the player's face indicates confusion, then the shopkeeper may be given additional explanatory lines of dialogue about the product. In an instance when the player's expression indicates happiness, then the shopkeeper's reaction may be more pleasant than if the player looks angry. Here again, the shopkeeper's statements may be based on user selection options by a player playing the role of the shopkeeper or may be made by a gaming device may be programmed to automatically provide statements that correspond to a player's expression or identified emotional state. After step 480, program flow may move to step 490 where other actions are performed. These other actions may include performing the steps discussed in respect to FIG. 2 or 3.

Figure 5:
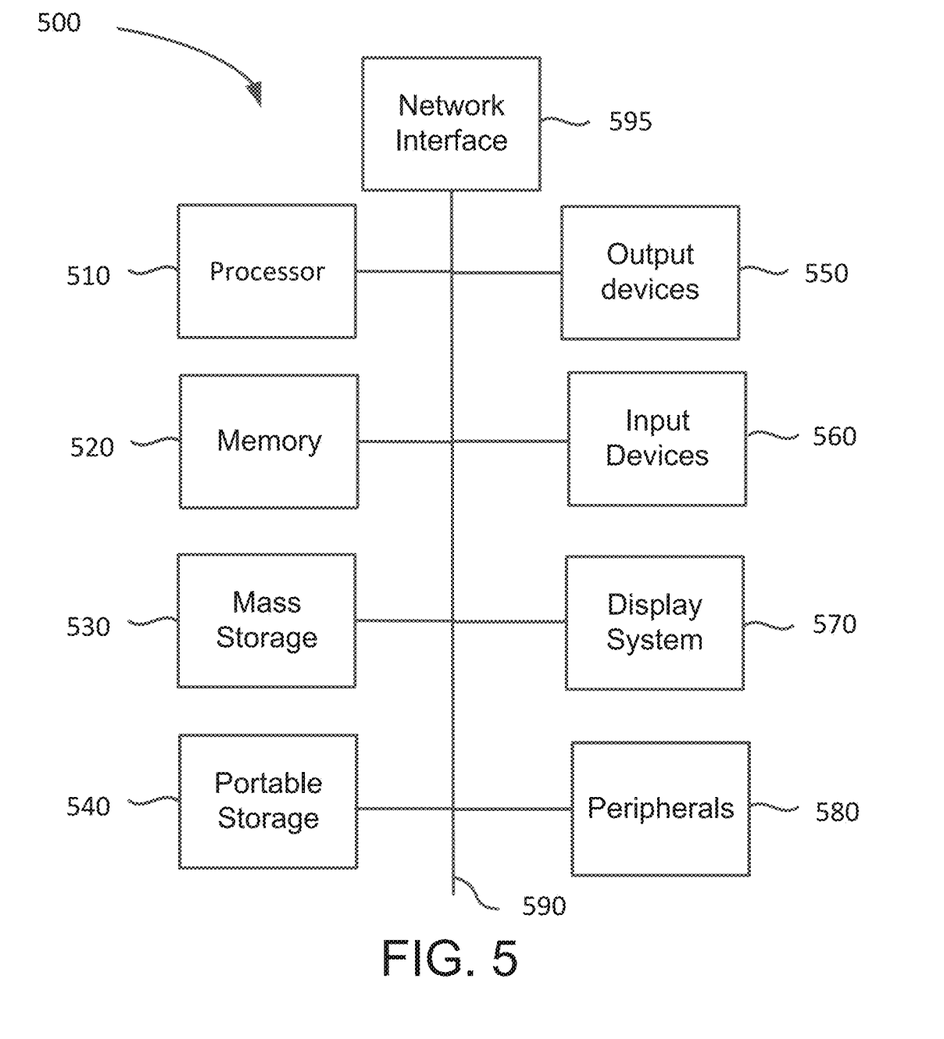
FIG. 5 illustrates a computing system that may be used to implement an embodiment of the present invention.

FIG. 5 illustrates a computing system that may be used to implement an embodiment of the present invention. The computing system 500 of FIG. 5 includes one or more processors 510 and main memory 520. Main memory 520 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, peripheral devices 580, and network interface 595.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 520.

Portable storage device 540 operates in conjunction with a portable non-volatile storage medium, such as a FLASH memory, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD), a plasma display, an organic light-emitting diode (OLED) display, an electronic ink display, a projector-based display, a holographic display, or another suitable display device. Display system 570 receives textual and graphical information, and processes the information for output to the display device. The display system 570 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 580 may include any type of computer support device to add additional functionality to the computer system. For example, peripheral device(s) 580 may include a modem or a router.

Network interface 595 may include any form of computer interface of a computer, whether that be a wired network or a wireless interface. As such, network interface 595 may be an Ethernet network interface, a BlueTooth™ wireless interface, an 802.11 interface, or a cellular phone interface.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer can also include different bus configurations, networked platforms, multi-processor platforms, etc. The computer system 500 may in some cases be a virtual computer system executed by another computer system. Various operating systems can be used including Unix, Linux, Windows, Macintosh OS, Palm OS, Android, IOS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a FLASH memory/disk, a hard disk, magnetic tape, any other magnetic medium, a CD-ROM disk, digital video disk (DVD), any other optical medium, RAM, PROM, EPROM, a FLASH EPROM, and any other memory chip or cartridge.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

What is claimed is:

1. A method for affecting non-player character behaviors based on player gaze, the method comprising:
monitoring one or more images captured regarding a user in a real-world environment during a current interactive session with a user device of the user;
identifying that the images indicates a gaze direction of the user is currently directed toward a location within a virtual environment that includes at least one non-player character;
identifying that the images indicate pupil dilation by the user;
identifying one or more action options for the at least one non-player character to perform within the virtual environment based at least on identifying that the images indicate pupil dilation by the user;
triggering performance of one of the action options by the at least one non-player character based on one or more characteristics of the gaze of the user; and
generating a display of the virtual environment that includes performance of the triggered action by the at least one non-player character,
wherein the triggered action includes changing a mannerism of the non-player character based on the determined pupil dilation.

2. The method of claim 1, further comprising:
generating a set of player options to present within the display in response to the performance by the at least one non-player character;
identifying a gaze direction being directed at a location of one of the options presented within the display; and
identifying the identified option as selected based on the location of the gaze direction.

3. The method of claim 1, wherein the triggered action includes introducing a new non-player character.

4. The method of claim 1, further comprising:
monitoring the images for facial expressions associated with the user;
determining that at least one of the images includes a facial expression indicating one or more of confusion, anger, happiness, or excitement; and
adding one or more new action options to the previously identified action options based on the determined facial expression.

5. The method of claim 4, wherein the triggered action includes changing a mannerism of the non-player character based on the determined facial expression.

6. The method of claim 1, wherein one or more characteristics of the gaze include a duration of the gaze, wherein the action by the non-player character is triggered based on the duration of the gaze meeting one or more thresholds.

7. The method of claim 1, wherein an intensity level of the triggered action is also based on the characteristics of the gaze.

8. The method of claim 1, wherein the current interaction session includes one or more other user devices of one or more other users, and wherein identifying the action options is further based on a gaze associated with the other users.

9. A non-transitory, computer-readable storage medium having embodied thereon a program executable by a processor for implementing a method for affecting non-player character behaviors based on player gaze, the method comprising:
monitoring one or more images captured regarding a user in a real-world environment during a current interactive session with a user device of the user;
identifying that the images indicates a gaze direction of the user is currently directed toward a location within a virtual environment that includes at least one non-player character;
identifying that the images indicate pupil dilation by the user;
identifying one or more action options for the at least one non-player character to perform within the virtual environment based at least on identifying that the images indicate pupil dilation by the user;
triggering performance of one of the action options by the at least one non-player character based on one or more characteristics of the gaze of the user; and
generating a display of the virtual environment that includes performance of the triggered action by the at least one non-player character,
wherein the triggered action includes changing a mannerism of the non-player character based on the determined pupil dilation.

10. The non-transitory, computer-readable storage medium of claim 9, further comprising instructions executable to:
generate a set of player options to present within the display in response to the performance by the at least one non-player character;
identify a gaze direction being directed at a location of one of the options presented within the display; and
identify the identified option as selected based on the location of the gaze direction.

11. The non-transitory, computer-readable storage medium of claim 9, wherein the triggered action includes introducing a new non-player character.

12. The non-transitory, computer-readable storage medium of claim 9, further comprising instructions executable to:
monitor the images for facial expressions associated with the user;
determine that at least one of the images includes a facial expression indicating one or more of confusion, anger, happiness, or excitement; and
add one or more new action options to the previously identified action options based on the determined facial expression.

13. The non-transitory, computer-readable storage medium of claim 12, wherein the triggered action includes changing a mannerism of the non-player character based on the determined facial expression.

14. The non-transitory, computer-readable storage medium of claim 9, wherein one or more characteristics of the gaze include a duration of the gaze, wherein the action by the non-player character is triggered based on the duration of the gaze meeting one or more thresholds.

15. The non-transitory, computer-readable storage medium of claim 9, wherein an intensity level of the triggered action is also based on the characteristics of the gaze.

16. The non-transitory, computer-readable storage medium of claim 9, wherein the current interaction session includes one or more other user devices of one or more other users, and wherein identifying the action options is further based on a gaze associated with the other users.

17. A system providing gaze-based controls for affecting non-player character behaviors based on player gaze, the system comprising:
a communication interface that communicates with a user device over a communication network, wherein the communication interface receives one or more images captured regarding a user in a real-world environment during a current interactive session with the user device of the user; and
a processor that executes instructions stored in memory, wherein the processor executes the instructions to:
identify that the images indicates a gaze direction of the user is currently directed toward a location within the virtual environment that includes at least one non-player character;
identify that the images indicate pupil dilation by the user;
identify one or more action options for the at least one non-player character to perform within the virtual environment based at least on identifying that the images indicate pupil dilation by the user;

trigger performance of one of the action options by the at least one non-player character based on one or more characteristics of the gaze of the user; and generate a display of the virtual environment that includes performance of the triggered action by the at least one non-player character, wherein the triggered action includes changing a mannerism of the non-player character based on the determined pupil dilation.

* * * * *